Aug. 12, 1969 W. R. HELLER 3,460,884
ELECTRO-OPTICAL DEVICES UTILIZING
THE STARK-SHIFT PHENOMENON
Original Filed Nov. 15, 1961 2 Sheets-Sheet 1

INVENTOR.
WILLIAM R. HELLER
BY
ATTORNEY

United States Patent Office 3,460,884

Patented Aug. 12, 1969

3,460,884

ELECTRO-OPTICAL DEVICES UTILIZING THE STARK-SHIFT PHENOMENON

William R. Heller, Pound Ridge, N.Y., assignor to International Business Machines Corporation, New York, N.Y., a corporation of New York Original application Nov. 15, 1961, Ser. No. 152,587. Divided and this application June 21, 1965, Ser. No. 475,034

Int. Cl. G02f 1/28, 1/36

U.S. Cl. 350—160 6 Claims

ABSTRACT OF THE DISCLOSURE

Electro-optical devices utilizing materials exhibiting the Stark-shift phenomenon having transparent electrodes located on opposite sides of the material to produce a strong electric field. Monochromatic light passing through the devices is affected by the Stark-shift of an absorption edge in the material thus affecting the transmission and/or refraction of light by the material. A prism type of device and a diffraction grating device are disclosed.

This is a division of application Ser. No. 152,587, filed Nov. 15, 1961.

The present invention relates to a novel system for controlling the transmission of a beam of light and more particularly, it relates to such control of a light beam by applying an electric field to a material interposed in the path of said beam.

In modern technology there are many requirements for rapid handling of information in electrical signal form which has been transmitted from one location to another or which has been subjected to processing by logical computing apparatus. In such apparatus, it is presently quite common to process a large body of information in an extremely short period of time. In such processing it is usually necessary to perform many thousands or millions of switching operations within as short a time as possible. While there are many different types of switches used such as relays, electronic tube switching circuits, etc. there is a continual search for faster, cheaper and more reliable systems than are presently available.

The term light switch as used herein refers to a combination of apparatus which is capable of controlling the transmission of light in response to an electrical signal.

In the past a number of different types of light switches or light relays have been devised and used with varying degrees of success. Such light switches offer many theoretical advantages, especially for use in computers, as a light beam can theoretically be shut off in times much less than are found in the response of typical light sources. Also there is complete electrical isolation between the input and output circuits.

In addition to the switching scheme mentioned above such as optical logic circuits, there is also the visual display field such as television, etc. wherein image display is accomplished virtually by switching a very large number of discrete illuminable segments between the on and off condition whereby an image is formed. It has long been the desire of engineers and scientists to achieve the effects attainable with a cathode ray tube with a device which is less bulky, cheaper to build and less subject to failure, the first two being of primary concern.

The simplest and best known types of light switches are the movable mask or iris diaphragm type of shutter as used, for example, in photography. This type of mechanical switching is far too slow for the type of usages set forth above and in addition would be subject to mechanical failure if actuated with the frequency necessary in a logical configuration as used in a computer.

Electro-optic elements have been utilized in the past to interrupt, deflect or otherwise alter a beam of light in some manner to achieve a switching action. One type of such a switch currently known to the prior art employs for instance, two light polarizers, each of which is capable of limiting the transmission of light therethrough to light which is polarized substantially in one plane. The light polarizers are usually positioned such that the axis of polarization of each is displaced with respect to the other. Between the polarizers there is positioned an electro-optical material which, displays birefringent properties and which upon the application of an electric potential across the material rotates the plane of polarization of light passing therethrough. The angles of polarization of the light polarizers can be so arranged that, when the electro-optical material is energized by an applied voltage, polarized light entering the electro-optical material from the first polarizer is in effect rotated to the polarization angle of the second polarizer so as to be transmitted through the second polarizer. If such energization and rotation of polarization does not exist, the cooperative action of the two polarizers is effective, as is well known, to prevent the transmission of light through said second polarizer. Such a system of light switching is utilized in U.S. Patent 2,909,972. These systems, while operable, are complicated and expensive to manufacture and moreover do not readily lend themselves to miniaturization as where a great many such switches are to be used in a computer switching matrix.

Another optical effect which has been known for many years but which seems never to have found practical application is the Stark effect. This phenomenon relates generally to the effect of a strong electric field upon the spectrum lines of a material subjected to its influence. The effect was originally observed in gases and only recently has been observed in certain solids. The usual observed effect is a shift in wavelength of some portions of the absorption and emission spectra. A detailed description of such electric field induced shifts in cadmium sulfide (CdS) appears in an article by Williams, "Electric Field Induced Light Absorption in CdS," in the Physical Review, vol. 117, No. 6, page 1487, Mar. 15, 1960 and in an article by Thomas, "Direct Observation of Exciton Motion in CdS," in Physical Review Letters, vol. 5, No. 11, page 505, Dec. 1, 1960. Although no practical use has even been previously made of such a phenomenon in an electro-optic element, it has now been found that effective light control can be obtained by using a strong electric field to control light transmission through certain materials.

It is accordingly the primary object of the present invention to provide an extremely fast light switch utilizing an electro-optic element.

It is another object of the invention to provide such a light switch capable of performing electrical switching operations in the millimicrosecond range.

It is another object of the invention to provide such a light switch utilizing changes in the coefficients of absorption and refraction in a light transmitting medium to obtain a switching effect.

It is another object to obtain a novel directional effect in the transmission or reflection light by the application of electric fields.

The foregoing and other objects, features and advantages of the invention will be apparent from the following more particular description of preferred embodiments of the invention, as illustrated in the accompanying drawings.

In the drawings:

FIG. 1 is a schematic representation of a simplified electro-optic light switching system according to the present invention;

FIG. 1*a* is a perspective view partly in the cross section of the electro-optic element of FIG. 1 showing the structural details thereof;

Figure 1:
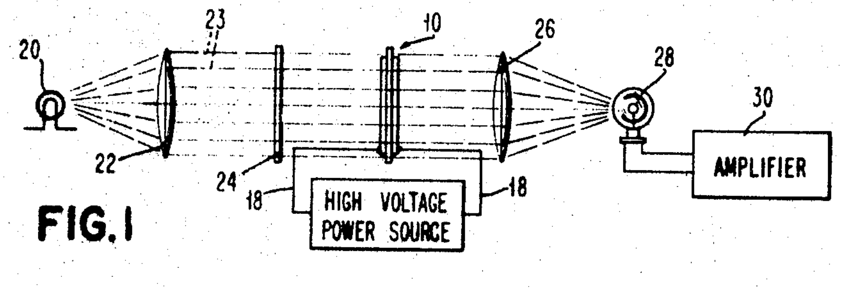

The objects of the present invention are accomplished in general by an optical system comprising a substantially monochromatic light source, a means for receiving light therefrom, a controllable light transmitting means interposed between said source and receiving means having substantially transparent electrodes on opposite faces thereof and power supply means for selectively applying a strong electric field across said transmitting means below the breakdown voltage thereof whereby the light reaching the receiving means is varied by applying said electric field.

In the preferred form of the invention the monochromatic light source is chosen to be of such a wavelength that it lies just outside the absorption band of the transmitting means when the latter is in a weak or negligible electric field and within said absorption band when it is in a high electric field or the converse. It is to be understood that the application of the electric field causes the absorption edge in the transmitting means to shift as will be more fully described subsequently.

Any solid material whose absorption is changing rapidly from weak to strong will exhibit a Stark shift in the region of the spectrum. Solids can be divided into two classes with respect to this effect. Those solids in which the absorption corresponds to an atomic, molecular or crystalline configuration which has a center of inversion (i.e., in which the relevant configuration is transformed into itself when each atomic position vector taken with reference to an appropriately chosen center is replaced by a minus vector) will show in general a smaller effect than those solids in which the absorbing configuration does not have such a center of inversion. Typical materials having such an inversion symmetry are:

AgBr, NaI, KI, RbI, CsI, TlI

Materials belonging to crystal classes not possessing a center of inversion symmetry are: $K_3CrO_8$, $Rb_3TaO_8$, $K_3TaO_8$, $K_3NbO_8$, $CsTaO_8$, $La_2MoO_6$, $K_2PdCl_4$, $Ag_2HgI_4$, $Cu_2HgI_4$, $AsBr_3$, Hg(BrCl), $SbBr_3$, $HgBr_2$,$CuBr_2$, $TlCrO_3$, TlBrTlI, $TlIO_4$, $AgClO_4$, $CsClO_4$, $KClO_4$, $NaClO_4$, $RbClO_4$, $TlClO_4$, CuCl, CuBr, CuI, AgI. $CH_3I$, $CaBr_2$, $CaI_2$, $BaBr_2$, $BaI_2$, $SrBr_2$.

It is of course to be understood that such solid materials which would be of use in the instant device must be capable of transmitting a measurable amount of monochromatic light in one or the other of the states, with or without the applied voltage.

The following discussion is believed to be an accurate description of the physical theory involved in the operation of the present invention, however, it is to be understood that this area is extremely new and unexplored and that scope of the invention is not intended to be limited hereby.

The effect of an electric field on the energy levels of an atom or a collection of atoms e.g., a molecule or a crystal is to split degenerate or almost degenerate levels and to shift non-degenerate levels downward or upward in energy. Since the energy of light absorbed by such a system is just the difference in energy of levels between which such transitions are allowed, a so-called "Stark shift" of absorption lines occurs upon application of an electric field. In the situation in which the levels are almost degenerate, the field induced split is proportional to the magnitude of the field, and in the second case, it is proportional to its square. The present discussion considers the change in the position of an absorption line or edge upon application of a strong electric field and also the broadening of separated levels in a strong field.

Two cases are to be distinguished, based upon the nature of electronic excitation in insulating solids. Since such solids are collections of strongly interacting atoms, any excitation must be characterized as belonging to the whole solid. The two cases can both be conveniently described as excitations in which an electron is removed from the valence band, leaving a hole in the valence band. The resulting electron-hole pair can then describe mutually (a) correlated or (b) uncorrelated motions.

Since the electron and hole at close range attract each other by modified Coulombic forces, in general excitations of type (a) lie lower in energy than those of type (b).

One can deal with a simple case included in type (a) if the dielectric constant of the crystal is fairly large (>5). Then the excitation of an electron from the valence band results in a state in which the electron and hole revolve around their mutual center of mass. The location and optical absorption due to excitations of this type have been calculated previously, and use can be made of these results to estimate the changes brought about by an electric field. Calculations of the Stark effect for isolated i.e., gaseous hydrogen-like atoms have likewise been made previously. The calculations are very thorough and some of the numerical results may be used in the present work on crystals. Keys to the understanding of all the calculations are first, the estimate of the shift of energy levels by the electric field, and second the estimate of the field required for significant changes in optical transition probabilities. Consider the effects first on the basis of perturbation theory:

The shift in energy ΔH of an unperturbed energy state corresponding to a crystalline wave function $\psi$ is $$\Delta H \sim \int \psi^* e\vec{F}\cdot\vec{r}\,\psi$$

$e$=charge on electron $\vec{r}$=displacement vector operator of electron $\vec{F}$=electric field vector The integral will vanish if the state in question has inversion symmetry, since the operation $$\vec{r} \rightarrow -\vec{r}$$

changes the sign of the integral without altering its value. According to the symmetry of the excited electronic states, then, one will or will not observe a Stark shift proportional to applied field for not too large fields. Here another consideration enters. In actual crystals of the type now under investigation, when $\epsilon$, the dielectric constant, is large the binding energy of the exciton $$\approx \epsilon \frac{I_B}{2}$$

is very small where $I_B$=½ ionization energy of hydrogen atom
$\epsilon$=dielectric constant $$\left(\approx \frac{13.56}{50} \approx \frac{1}{4}\right.$$

electron volts), (for germanium even less) and so the exciton states are subject to "auto-ionization" in the electric field. This reduces the lifetime of the excited states, thus broadening out the quantum levels, so that absorption is spread out over a broad range of frequencies instead of lying in a narrow band. Thus the effective absorption coefficient for sufficiently monochromatic light is reduced. The critical field $F_{crit}$ required to wash out the absorption or remove the peak is derived by converting the principal quantum number $n$ into one modified by the dielectric constant $\epsilon$.

$$F_{crit} \sim \frac{320}{n^4 \epsilon^4} \times \left(\frac{7}{5}\right) \text{ million volts/cm.}$$

This has to modified by a factor $\mu/m_{el}$, where $\mu$=reduced mass of hole-electron combination. In cadmium sulfide, for example, $\epsilon \sim 9.3$, $\mu \sim 0.18\ m_{el}$, where $m_{el}$ equals mass of the electron, and we get for the critical field strength of the $n=2$ level:

$$[F_{crit}(\text{volts/cm.}]\ CdS \simeq (320)\left(\frac{7}{5}\right) \cdot \frac{1}{16 \cdot (9.3)^4}(0.18) \times 10^6 \simeq 680 \text{ volts/cm.}$$

In this particular material it is possible to make exciton absorption lines, (for example at 4855 A. in CdS) broaden out and essentially disappear.

Adding to this effect will be the shift to longer wavelengths of the continuous band to band transitions.

In cadmium sulfide the splitting of levels for relatively small field strengths can also be estimated.

For a degenerate hydrogenic term of principal quantum number $n$ there is obtained a splitting $\Delta E$ between levels to which transitions from the ground state are allowed.

$$\Delta E(\text{cm.}^{-1}) = \frac{F(\text{volts/cm.})}{15{,}590}(2) \times \frac{n(n-1)\epsilon}{F = 1000 \text{ v./cm.} \simeq}$$

Thus in CdS, at 4855 A., for $n=2$, $$\Delta E \simeq \frac{38{,}000}{15{,}590} \simeq 2.5 \text{ cm.}^{-1}$$

This means a percentage split of $$\frac{2.5 \times 100}{2 \times 10^4} \simeq .01\%$$

or about ½ angstrom. In this material, therefore, the disappearance of the line because of ionization by the field will begin to be significant at lower fields than those at which the splitting will be easily observable. As implied earlier, it is best to apply the filed to a crystal lacking inversion symmetry like CdS, which may have degenerate levels. However, the auto-ionization effect in strong fields is essentially independent of the symmetry of the original electronic levels. A principal feature in CdS will be the photo-current resulting from the effect although there will also be observable effects on the structure of the absorption spectrum even at higher temperatures.

Considering now the well-bound exciton, as exemplified by the alkali halides in which the dielectric constant is not as high as in CdS or Ge, the hydrogenic formulas are not very useful, and a picture of the exciton spectrum has to be derived from necessarily more approximate crystalline wave function. The effects of the interaction of electron spin and spatial orbits on the fine structure of the exciton peaks in the halides have been estimated and the conclusion is that this splitting is always larger than the Stark shift or split for each component in moderate fields. Nevertheless, energy levels for the proper symmetry lying near those observed in absorption will cause a linear Stark effect to occur. Special characteristics of these materials are the following:

(a) Since these materials absorb strongly, thin films are essential to get a measurable amount of light through.

(b) Rather strong temperature sensitivity (80 A. shift to blue in KI as one passes from 293° K. to 20° K.). This is characteristic of ionic crystals and is somewhat less pronounced in CdS, Ge, etc.

(c) Good insulation. Dark and photocurrents should not be troublesome here, but they may very well be in CdS and similar materials, where photocurrents in reasonable light flux may be of order 100–1000 x dark current. The latter in typical semiconductors may be as "low" (in practice, uncomfortably high) as 1 amp./cm.$^2$ in volts/cm., but even this is quite optimistic for most crystals of this material at room temperature. In NaCl and other insulating solids, on the other hand, negligible dark and photocurrents are to be expected at room temperature.

(d) Little or no auto-ionization at moderate fields hence the necessity here for reliance on split or shift.

Polar crystals show an absorption edge dependence upon temperature corresponding to $$\log_e K_{opt} \simeq \log K_{max} - \frac{\text{const } (hu - hu_o)}{T}$$

Here $\log_e K_{opt}$ is the logarithm to the base $e$ of the optical absorption coefficient defined by the fractional change in transmitted intensity of a parallel light beam incident normally upon an absorbing material upon increasing the thickness of this material:

$$K_{opt} = \frac{ldI}{Idx}$$

$\nu$=frequency of incident light
$\nu_o$=frequency corresponding to extrapolated peak absorption
K=Boltzmann constant
T=absolute temperature This temperature sensitivity is not greatly different numerically from that of such crystals as germanium. The range to be expected is $2-8 \times 10^{-4}$ ev./degree K.

This is approximately ½—2A. shift per degree in the green. Temperature control will therefore have to work to no better than ½°, to match the effect of reasonable field strengths.

The net effect of the splitting of energy levels within the atoms or molecules changes their optical characteristics, that is, as stated above, spectral lines observed in absorption are caused to shift. In any given material this shift is most pronounced at only one or two wavelengths. Thus, in the present invention a light source is used having a very narrow bandwidth (essentially monochromatic) and when an electric field is applied to such an element through which the light is caused to pass, an appreciable change of light transmission occurs due to the shift of the absorption spectrum of the material at that wavelength. The effect is more fully described later with respect to FIGS. 1 and 1*a*.

It should be noted that with different materials the most significant shift may occur at widely spaced wavelengths. Also the strength of the field and hence the voltage/thickness ratio of the electro-optic material will vary the magnitude of the shift.

Figure 1A:
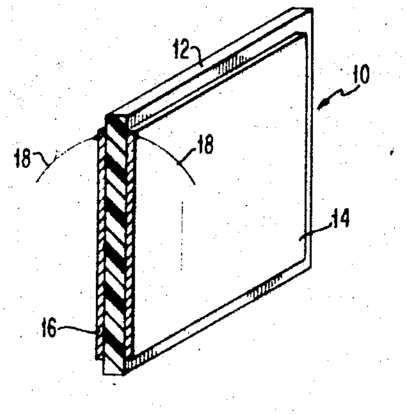

The invention will now be particularly pointed out and described with respect to specific embodiments as exemplified by the drawings wherein FIG. 1*a* shows a very basic light switching element utilizing the principles of the present invention. The device 10 comprises a thin layer of electro-optic material 12 having transparent electrodes 14 and 16 on opposite faces thereof. Electrical leads 18 are provided for connecting a high voltage power supply to the element to thus set up a strong electric field across the electro-optic material as is required to obtain a Stark shift of the absorption lines as set forth above.

A number of different materials have been found to be useful as the electro-optic material 12. These include cadmium sulfide, potassium iodide, many of the alkaline halides and others as listed earlier.

Also, a number of different materials may be used for the substantially transparent electrodes 14 and 16. One system as set forth in copending application No. 152,584 of the present inventor, J. C. Powers and J. Kumamoto concurrently filed herewith comprises casting a conducting gelatin film on two glass slides and mounting the electro-optic material 12 therebetween clamping the whole of the structure together to form a composite multi-layered device. Another method of forming a transparent electrode is to vaporize certain metals such as silver upon the surface of the electro-optic material or to form an electrically conductive stannous oxide layer on glass also as disclosed and discussed in the above identified copending application.

Figure 2:
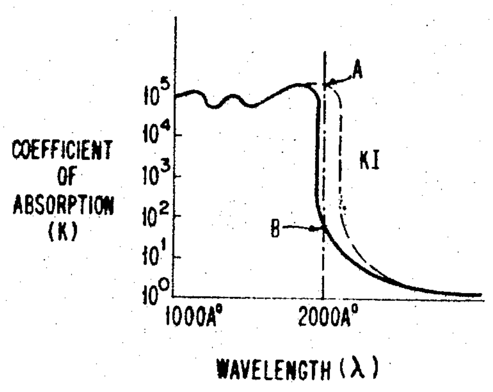
FIG. 2 is a graphical representation of the light transmitting mechanism of FIG. 1 showing the coefficient of absorption versus wavelength (λ) showing the effect of an applied electric field.

The effect of the electric field on the light transmission properties of the material may be more clearly seen in FIG. 2 wherein the coefficient of absorption of a potassium iodide crystal is plotted against wavelength of impending light. In this figure the solid line represents the absorption diagram with no electric field and the dotted line represents the diagram when the electric field is applied. It may thus be seen that if light from a suitable monochromatic light source is chosen to emit at approximately 2000 A., the coefficient of absorption will vary between the points A and B upon the application of a strong electric field to the two electrodes. Since the intensity of light transmitted through a medium is:

$I = I_0 - I_0 e^{-(K_{opt})(X)}$, where
$I_0$=incident light intensity minus reflected intensity
X=thickness of absorbing material
I=transmitted intensity
$K_{opt}$=optical density it may be readily seen that the light transmitted through the member will vary materially when an electric field is applied. Thus, a light switching system utilizing such an element is suggested.

Such a system is disclosed schematically in FIG. 2 wherein a monochromatic light source 20 causes light to shine upon collimating lens 22 which forms the parallel light beam 23 which further passes through an interference filter 24 for the purpose of filtering out all but the light of the desired frequency. The light beam 23 passes through the electro-optic switching element 12 then through condensing lens 26 and falls upon a photo-sensitive device 28 such as a photocell. When no electric field is applied to the element 12 light of a first intensity reaches the photocell 28 and when an electric field is applied to the member 12 light of a different intensity reaches photocell 28 as will be understood from the above discussion. The amplifier detector unit 30 is suitably chosen so that, for example, when light of the first intensity falls on photocell 28 no signal will be developed and when light of a greater intensity falls upon said photocell a signal will be developed. Such a system may either be used as a simple light switch preferably where it is not desired to completely cut off the light passing through the element or in logic applications. In the latter, when a signal is fed to the element 12, a signal either will (1) or will not (0) be developed at the output of the amplifier 30. Such a device has the additional advantage of complete electrical isolation between the input to the power supply which would receive the signal to be applied to the element 12 and the output of the amplifier 30.

The limits of performance of a usable light switch are indicated by the following requirements.

(a) The intensity contrast required for the on and off positions should at least amount to a ratio of brightness (ratio of logarithms to base 10 of "on" and "off" intensities) of unity, or an intensity ratio of ten to one. Thus the product of the change in absorption index (ΔK) by the total light path ($t$) in the absorbing material should amount to $\log_e 10$ or about 2.3.

(b) The limiting intensity of the light in the "on" position should be sufficiently high to affect a photocell appreciably more than the noise generated within the tube itself. This means that the light intensity in the "on" position must exceed a figure of some $10^{-12}$ watts. A lower figure could be used if the photocell were operated at low temperatures. Conventional (non-laser) light sources rarely emit more than one one-hundredth of a watt in a wavelength interval of about five angstroms. Thus the product of absorption index (K) by thickness ($t$) must not exceed a value of approximately 23.

Combining these two considerations, we obtain as limits for the valves of ΔK, K and $t$ the relations $$\Delta K t \gtrsim 2.3$$
$$K t \leq 23$$

or $$\frac{2.3}{\Delta K} \leq t \leq \frac{23}{K}$$

The application to light switching therefore demands that one use small thicknesses if K is high and large thicknesses if K is small. Since in the last mentioned situation it is difficult to achieve high electric fields if the voltage is applied normal to the plane of the absorbing materials, one must in this case use a light path transverse to the field.

Still another possible embodiment of the present invention utilizes a prism 40 for deflecting the light beam. The system disclosed in FIG. 3 comprises again a monochromatic light source 20, a collimating lens 22, an interference grating 24 for filtering out unwanted frequencies, the prism itself 40, a mask 48 having a small aperture 50 therein, a photocell 28 and an amplifying circuit 30 therefor. The prism 40 is similar to the switching element 10 except that the electro-optic material 42 is wedge shaped and the conductive electrodes 44 and 46 are on opposite sides of the wedge.

Figure 3:
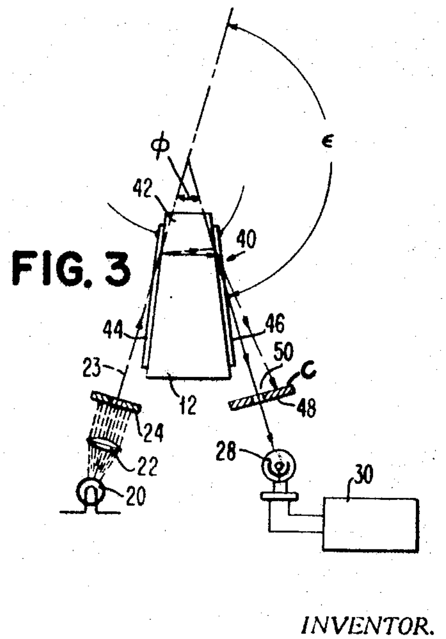
FIG. 3 is a schematic representation of another light switching system according to the present invention.

In operation, the light beam 23 strikes the first side of the prism and as is well known is deflected due to the change in refractive index of the material, passes through the prism and out the other side where it is again deflected and follows a given path depending upon whether or not an electric field is applied to the electrodes 44 and 46 as will be more fully explained subsequently. In the embodiment shown using a potassium iodide crystal when an electric field is applied thereto the index of refraction is such that the light follows a path and strikes a mask 48 at point C and thus does not reach the photocell 28. But when an electric field is applied to the two electrodes the index of refraction is changed as will be discussed subsequently and the light follows a path within the crystal and passes out of the crystal surface at a point such that it passes through the aperture 50 within the mask and will thus strike the photocell 28. The device of FIG. 3 is obviously better suited as an on-off switching device in that of FIG. 1 since the light beam 23 either passes through the aperture 50 or does not. Thus the circuitry of the amplifier 30 utilized with such a system may be somewhat simplified and adjustment would be less critical.

In explaining the operation of this embodiment of the invention, as has been already stated, the coefficient of absorption of the electro-optic material 42 changes upon the application of a strong electric field. However, it is known that the index of refraction of a transparent material varies as the coefficient of absorption varies according to the formula:

$$n_a - 1 = \frac{1}{2\pi^2} Pr \int_0^\infty \frac{K\,d\lambda}{1 - \lambda^2/\lambda_a^2}$$

An approximate evaluation of this formula at angular frequency $\omega_a$ near an absorption edge, is:

$$n_a(\omega_a) - 1 \approx \sum_j \frac{(\omega_j^2 - \omega_a^2) C_j}{(\omega_j^2 - \omega_a^2)^2 + \omega_a^2 g_j^2} + \frac{c}{2\pi} \cdot \left(\frac{dK}{d\omega}\right)_{\omega=\omega_a}$$

Here $\omega_a$ is the angular frequency of observation and $\omega_a >> \text{all } \omega_j$; these indexed frequencies being considered to be below $\omega_a$. $C_j$ the dimension of angular frequency squared and $g_j$ measures the breadth of absorption band $j$. The second term is the most important one in or near an absorption band. If the other frequencies characterizing the insulator, $\omega_j$, are sufficiently far removed from the one under study, one can write $$n_a(\omega_a)-n_{below}\approx\frac{c}{2\pi}\left(\frac{dK}{d\omega}\right)=\frac{c}{4\pi^2}\left(\frac{dK}{d\nu}\right)_{\nu=\nu_a}$$

Frequency $\nu_a$ corresponds to that of the incident, nearly monochromatic light. It is obviously advantageous to work at a frequency $\nu_a$ where the rate of change of absorption $dK/d\nu_a$ is maximum.

The angle of refraction of light leaving one medium (e.g., vacuum) and entering another may be calculated from the well known formula (Snell's law):

$$\sin\theta_{vac}=\tilde{n}_m\sin\theta_m$$

In the device under study $\tilde{n}_m$, the index of the medium is a complex number, so that light will be both absorbed and refracted. If the prism thickness is somewhat smaller than 1/K, however, one may use the real part of $\tilde{n}_m$, $n_m$, to get an approximation to the ray path. From elementary considerations, a ray entering a prism at the so-called angle of minimum deviation is deflected by an angle $\epsilon$.

$$\epsilon=(n_m-1)\phi$$

Here $\phi$ is the angle of the prism (see FIG. 3) and $n_m$ is the real part of the index. The effectiveness of the switching is thus directly proportional to the rate of change of the index with electric field strength.

$$\frac{\Delta\epsilon}{\Delta F}=\left(\frac{\Delta n}{\Delta F}\right)\phi$$

Use of the formula for index given above results in the following estimate of useful deflection angles in terms of the shift of the center frequency $\nu_o$ of the absorption index near which one wishes to work $$\frac{\Delta\epsilon}{\Delta F}=\frac{\phi C}{A\pi^2}\frac{d^2K}{d\nu d\nu_o}\frac{d\nu_o}{dF}=\frac{\phi C^2}{4\pi^2}\cdot\frac{d^2K}{d\nu d\nu_o}\cdot\frac{1}{\lambda_o^2}\frac{\Delta\lambda_o}{\Delta F}$$

For a typical arrangement, such as that utilizing a thin prism of potassium iodide, of angle, say 0.1 radian, one can calculate the rate of change of deflection angle with field once the shift of absorption edge with field is known. For a shift with field of .005 A. per electrostatic unit of field strength, one obtains a value of $\Delta\epsilon/\Delta F$ of approximately 0.00025 radian/esu of field.

By sacrificing the property of minimum deviation, it is possible to obtain greater angular deviations for a given change in index. Thus a significantly large switching effect or change in the direction of the light beam can be achieved by using this particular device. It should also be noted that with the wedge shaped prism 40 the distance between the electrodes 44 and 46 varies along the length of the prism. Thus, the field intensity across the material between these electrodes also varies. It is therefore possible by directing the incident light beam at different portions of the prism to select a portion wherein the index of refraction and thus the amount or degree of deflection of the light beam will vary.

It is also clear that a closely related design would permit the control of the focal lenth of lenses by shaping a thin transparent sheet so that appropriate variations of electric field could be made for rays entering a lens at various distances from the axis of the lens system. Various lens aberrations could be corrected thereby.

Figure 4:
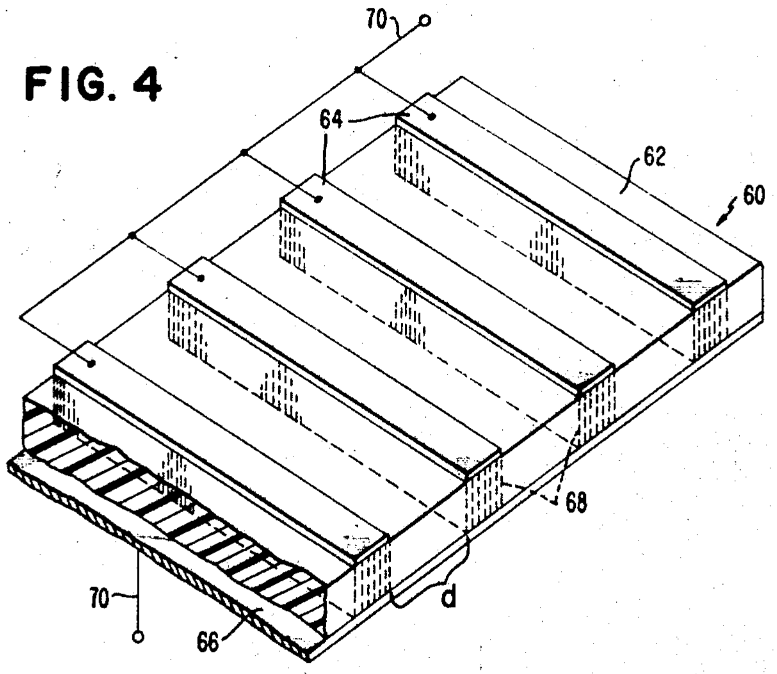
FIG. 4 is a perspective view partly in cross section of a unique diffraction grating constructed in accordance with the teachings of the present invention.
Figure 4A:
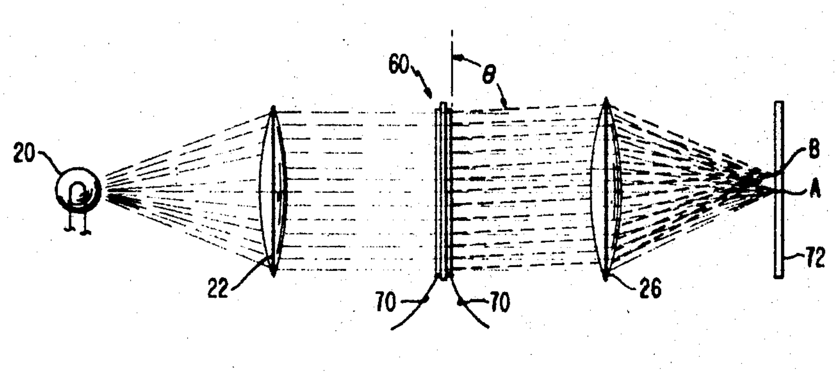
FIG. 4*a* is a diagrammatic representation of the switching effect of the grating of FIG. 4.

Still another embodiment of this invention is shown in FIGS. 4 and 4*a* wherein a diffraction grating 60 embodies the principles of this invention. The grating comprises a thin sheet member 62 composed of the electro-optic material exhibiting a Stark shift as disclosed and described with reference to the other embodiments of the invention. Transparent electrically conductive electrodes 64 and 66 are located on opposite sides of the electro-optic material 62. The strip electrodes 64 are placed on the one surface of the material of such a width and laterally spaced so that they form an optical grating as is known in the art. In operation the device work as follows. When there is no electric power source connected to the leads 70 the grating 60 will appear as an ordinary sheet of transparent material to light incident thereon. However, when an electric field is applied to the leads 70 areas 68 shown in the shaded lines between the strip electrodes 64 and sheet electrode 66 take on different optical characteristics with respect to the changes in the coefficient of absorption and the index of refraction as discussed more fully above. It has been found that these changes in optical characteristics of the areas 68 produce a pronounced grating effect (i.e., modulation or variation of the light intensity in a particular direction) in the device 60. Thus, the light switching or modulating arrangement shown in FIG. 4*a* comprises a monochromatic light source 20, a collimating lens 22, the diffraction grating 60, converging lens 26 and a suitable screen 72 or receiving element for the light passing through the grating. When an electric field is applied to the leads 70 the focused light beam 23 is caused to move from point A to point B corresponding to the variation in index of the operating material.

The diffraction grating 60 shown in FIGS. 4 and 4*a* may be used in a similar manner to the prism of FIG. 3 in that the grafting can be used to deflect the light beam either toward or away from a hole in a masking arrangement so that a light sensitive device located behind the mask will or will not be energized according to the condition of energization of the grating.

This can be done for example by energizing alternately every other electrode rather than every one. In this way, the spacing of the grating is doubled, and the angle of deflection is reduced according to the well known grating formula $m\lambda=2d\sin\theta$, where $m$ is an integer. $\lambda$ the wavelength, $d$ the spacing and $\theta$ the angle of deflection in order $m$. It can also be done as stated above by accepting the undeflected beam with field off and allowing the field itself to create the grating effect. The grating electrode can be made much less than a wavelength in thickness. Such gratings can be constructed as "glazed" gratings, in which as much as 90% of the light can be thrown into a given order, $m$.

It will be seen that all of the above embodiments of the invention include the basic light switch as set forth in FIG. 1. As stated this basic element consists of an electro-optic material 12 exhibiting a "Stark" shift and the two oppositely disposed transparent electrically conductive electrodes 14 and 16. The critical limitation which each of these elements must meet is, of course, the fact that they will exhibit a "Stark" shift when placed in a strong electric field. As stated previously in the specification, the requirement of such material is that it should exhibit reversible changes in the absorption of light (and consequently, in the refraction of light) when such electric field is applied. As stated above, an approximate criterion for the utility of such materials is the fractional change in absorption coefficient caused by the application of electric field be of order $1/10$ or more in the region of the spectrum where they are to be used. This entails a similar change in refraction index, when the absorption is strong (K that is, with or without field, is of order $10^5$ cm.$^{-1}$).

As stated previously, the present invention possesses great utility not only as a light switch per se but also as a light modulation device. Hence the term light switch as used herein refers broadly to both switching and modulation schemes. In the single light switching element and also the diffraction grating embodiments the beam of light may be modulated by varying the intensity of the electric field across the electro-optic material. This aspect of the invention has great potential utility for the modulation of "laser" beams in, for example, the communication field where it has been difficult in the past to achieve such modulation by other than mechanical means.

While the invention has been particularly shown and described with reference to preferred embodiments thereof, it will be understood by those skilled in the art that various changes in form and details may be made therein without departing from the spirit and scope of the invention.

What is claimed is:

1. A light deflecting system comprising a monochromatic light source, a wedge shaped electro-optic element and a photo-responsive pick-up device, said wedge shaped element being disposed with respect to the light source and pick-up device so that a beam of light strikes the wedge shaped element at an acute angle with respect to the surface thereof and on the side of a line normal to the surface at the point of incidence from the projected apex of said wedge, said light beam being refracted as it passes into the wedge shaped element and being refracted a second time as it leaves the element on the opposite side, from which it may be directed toward the photo-responsive device, said element including two thin transparent electrodes located in surface to surface contact with said wedge shaped element on opposite sides thereof at least where the light enters into and leaves said element, power means for selectively applying a high intensity electric field to said element, said element being constructed of a material which exhibits a Stark shift at at least one point of its absorption spectrum, said monochromatic light source frequency being chosen so that it falls within the area of said Stark shift in the material whereby when there is no field applied across the material through the electrodes the beam of light undergoes a directional displacement of a first magnitude in passing into, through and out of the wedge shaped element and when the electric field is applied it undergoes a different directional displacement whereby the beam of light will be directed toward or away from said pick-up device depending on the condition of directional displacement caused by said wedge shaped element.

2. A light deflecting system as set forth in claim 1 including a masking element placed between said photo-responsive element and said wedge shaped element and having a small aperture therein such that the light from the light source passes through said aperture to the photo-responsive element only when the directional displacement of said beam is equal to one of said two magnitudes.

3. A light deflecting system comprising a monochromatic light source, a wedge shaped electro-optic element and a photo-responsive pick-up device, said wedge shaped element being disposed with respect to the light source and pick-up device so that a beam of light strikes the wedge shaped element at an acute angle with respect to the surface thereof and on the side of a line normal to the surface at the point of incidence opposite from the projected apex of said wedge, said light beam being first refracted at it passes into the wedge shaped element and being refracted a second time as it leaves the element on the opposite side, from which it may be directed toward the photo-responsive device, said element including two thin transparent electrodes located in surface to surface contact with said wedge shaped element on opposite sides thereof at at least where the light enters into and leaves said element, power means for selectively applying a high intensity electric field to said element, said element being constructed of a material characterized by the fact that it has an absorption edge wherein the absorption is changing rapidly from weak to strong at at least one point of its absorption spectrum and wherein said edge shifts substantially under the influence of a strong electric field, said monochromatic light source frequency being chosen to fall within the area of said shift whereby when there is no field applied across the material through the electrodes the beam of light undergoes a directional displacement of a first magnitude in passing into, through and out of the wedge shaped element and when the electric field is applied it undergoes a different directional displacement whereby the beam of light will be directed toward or away from said pick-up device depending on the condition of directional displacement caused by said wedge shaped element.

4. An electro-optic system which comprises an electrically energized diffraction grating and a monochromatic light source adapted to pass a beam of light therethrough, said grating being composed of a thin sheet of a material which exhibits a Stark shift at at least one point of its absorption spectrum and having on at least one side thereof in surface to surface contact therewith a series of thin transparent electrodes spaced sufficiently close together to produce a grating effect and transparent conductive electrode material on the opposite side of said layer so as to produce a strong electric field within the material directly under the strip electrodes, means for selectively applying a source of high voltage to said strip electrodes whereby when no electric field is applied to said electrodes the sheet of material is optically homogenous throughout and when an electric field is applied to said electrodes the area thereunder is of a different optical density than the rest of the material thereby producing a grating effect.

5. An electro-optic system as set forth in claim 4 wherein said last named means includes switching means for selectively energizing all of the strip electrodes on the one surface of the diffraction grating.

6. An electro-optic system as set forth in claim 4 wherein said last named means comprises switching means for energizing different ones of said strip electrodes to effectively vary the grating spacing to obtain different orders of diffraction emanating from said grating.

References Cited

UNITED STATES PATENTS

| | | | |
|---|---|---|---|
| 3,025,763 | 3/1962 | Schwartz et al. | 350—160 |
| 3,271,578 | 9/1966 | Bockemuehl | 350—160 |

RONALD L. WIBERT, Primary Examiner

W. L. SIKES, Assistant Examiner